United States Patent
Yamamoto et al.

(10) Patent No.: US 9,075,399 B2
(45) Date of Patent: Jul. 7, 2015

(54) POSITIONING CONTROL SYSTEM FOR ACTUATOR PROVIDED WITH WAVE GEAR DEVICE

(75) Inventors: Masafumi Yamamoto, Azumino (JP); Yoshifumi Okitsu, Azumino (JP); Makoto Iwasaki, Nagoya (JP)

(73) Assignees: HARMONIC DRIVE SYSTEMS INC., Shinagawa-Ku, Tokyo (JP); NATIONAL UNIVERSITY CORPORATION NAGOYA INSTITUTE OF TECHNOLOGY, Nahoya-Shi, Aichi (JP)

( * ) Notice: Subject to any disclaimer, the term of this patent is extended or adjusted under 35 U.S.C. 154(b) by 0 days.

(21) Appl. No.: 14/240,752

(22) PCT Filed: Oct. 24, 2011

(86) PCT No.: PCT/JP2011/005951
§ 371 (c)(1),
(2), (4) Date: Feb. 25, 2014

(87) PCT Pub. No.: WO2013/061362
PCT Pub. Date: May 2, 2013

(65) Prior Publication Data
US 2014/0203752 A1    Jul. 24, 2014

(51) Int. Cl.
*G05B 5/01* (2006.01)
*G05B 5/00* (2006.01)
(Continued)

(52) U.S. Cl.
CPC ............... *G05B 5/00* (2013.01); *F16H 49/001* (2013.01); *G05B 2219/49292* (2013.01); *H02P 23/00* (2013.01)

(58) Field of Classification Search
USPC ......... 318/620, 623, 560, 561, 625, 677, 486, 318/611; 700/54, 71, 275; 702/94
See application file for complete search history.

(56) References Cited

U.S. PATENT DOCUMENTS

| | | | |
|---|---|---|---|
| 6,515,442 B1 * | 2/2003 | Okubo et al. | 318/560 |
| 2009/0200979 A1 * | 8/2009 | Sasaki et al. | 318/632 |

(Continued)

FOREIGN PATENT DOCUMENTS

| | | |
|---|---|---|
| JP | 63-66611 A | 3/1988 |
| JP | 2000-187404 A | 8/2009 |

(Continued)

OTHER PUBLICATIONS

International Search Report (PCT/ISA/210) mailed on Nov. 15, 2011, by the Japanese Patent Office as the International Searching Authority for International Application No. PCT/JP2011/005951.

(Continued)

*Primary Examiner* — Kawing Chan
*Assistant Examiner* — Jorge L Carrasquillo
(74) *Attorney, Agent, or Firm* — Buchanan Ingersoll & Rooney PC

(57) ABSTRACT

A positioning control system for an actuator provided with a strain wave gearing is provided with: a semi-closed feedback controller FB(s) that controls a load shaft position $\theta_l$ on the basis of a feedback motor shaft position $\theta_m$; and a feedforward linearization compensator configured by incorporating a nonlinear plant model for an object to be controlled into a feedback linearization compensator using an exact linearization technique. The feedforward linearization compensator uses a forward-calculated state quantity estimated value x* to calculate a feedforward current instruction $i^*_{ref}$ and a feedforward motor position instruction $\theta^*_m$ to be input into the feedback controller FB(s). A positioning error caused by a non-linear element (non-linear spring property, relative rotational synchronization component, and non-linear friction) of the strain wave gearing is compensated for by the feedforward linearization compensator.

4 Claims, 9 Drawing Sheets

Block diagram of plant system with nonlinear components

(51) Int. Cl.
*H02P 23/00* (2006.01)
*F16H 49/00* (2006.01)

(56) References Cited

U.S. PATENT DOCUMENTS

| | | | |
|---|---|---|---|
| 2010/0092248 A1 | 4/2010 | Kim | |
| 2011/0054820 A1* | 3/2011 | Sasaki et al. | 702/94 |
| 2011/0248661 A1* | 10/2011 | Okitsu et al. | 318/632 |
| 2012/0271459 A1* | 10/2012 | Okitsu et al. | 700/275 |

FOREIGN PATENT DOCUMENTS

| | | |
|---|---|---|
| JP | 2010-90695 A | 4/2010 |
| WO | WO 2010/116607 A1 | 10/2010 |

OTHER PUBLICATIONS

Ishijima et al., Nonlinear System Theory, Measurement Automatic Control Society Compilation, Corona Publishing Co., Ltd., pp. 141-168, 1993.

Godler Ivan, Haguruma Gensokuki no Kakudo Dentatsu Gos ni Kiin suru Sokudo Hendo no Yokusei Seigyo, Journal of the Society of Instrument and Control Engineers, Oct. 2000, vol. 39, No. 10, pp. 651-654.

Toshiaki Miyazaki, Robust Speed Control for Robot Arm with Angular Transmission Error of Gear, Dai 16 Kai Annual Conference of the Robotics Society of Japan Yokoshu, The Robotics Society of Japan, Sep. 18, 1998, pp. 443-444.

* cited by examiner

Experimental setup

Block diagram of plant system with nonlinear components

Static nonlinear spring characteristics

Synchronous components of angular transmission error

Static nonlinear friction characteristics

Conceptual block diagram of exact linearization method

Block diagram of feedforward compensator for nonlinear characteristics by exact linearization method Response waveforms for target angle of 43.56 Load deg Response waveforms for target angle of 43.2 Load deg

POSITIONING CONTROL SYSTEM FOR ACTUATOR PROVIDED WITH WAVE GEAR DEVICE

TECHNICAL FIELD

The present invention relates to a positioning control system for an actuator for reducing rotational output of a motor via a wave gear device and outputting the reduced output from a load shaft. More specifically, the present invention relates to a positioning control system for an actuator provided with a wave gear device, designed so that an exact linearization method can be used to suppress the loss of positioning control precision for a load shaft due to nonlinear spring characteristics, relative rotation-synchronous components, and nonlinear friction of the wave gear device.

BACKGROUND ART

Certain actuators use a wave gear device as a reducer for reducing and outputting the rotation of a motor. A known example of a controller for controlling the positioning of an actuator of this configuration is a semi-closed loop control system in which the rotational position and rotational speed of a motor shall are detected by an encoder attached to the motor shall, and are used as a basis for controlling the rotation of a load shaft, which is the output shall of the reducer. In a semi-closed loop control system, the characteristics of the wave gear device have a great effect on the positioning control characteristics of the load shaft because the driving of the motor is not controlled by directly detecting the rotational information of the load shaft.

The wave gear device has nonlinear spring characteristics and nonlinear friction that come with hysteresis due to a unique structure that uses the elastic deformation of the gear thereof. The vibration or angular transmission error (relative rotation-synchronous component) that occurs synchronously with rotation due to gear machining errors or assembly errors causes steady state deviation or vibration, particularly in the load position of the semi-closed loop control system. Therefore, a control system that can uniformly compensate such nonlinear characteristics is needed in order to achieve high precision control of the load shaft.

Exact linearization methods for input/output relationships are known as examples of methods for controlling objects to be controlled including nonlinear elements. FIG. 6 shows a block line diagram of exact linearization. Exact linearization is a method in which a nonlinear plant model having a non-linear relationship within a state equation is constructed for an object to be controlled including nonlinear elements, linearization feedback α(x) and input conversion β(x) are applied, and the object to be controlled is linearized using no approximation by establishing, from the input v of an expanded system including α(x) and β(x), the values of α(x), β(x) at which the characteristics of the output y will be $d^n y/dt^n = v$ (Non-patent Document 1).

PRIOR ART DOCUMENTS

Non-Patent Documents

Non-patent Document 1: "Nonlinear System Theory," Ishijima et. al., Measurement Automatic Control Society Compilation, Corona Publishing Co., Ltd., pp. 141 to 168, 1993

DISCLOSURE OF THE INVENTION

Problems to be Solved by the Invention

In the specification and drawings of JP Application No. 2010-090695 (filed on Apr. 9, 2010), the inventors and others propose that in a semi-closed loop control system of an actuator for reducing rotational output of a motor via a wave gear device and outputting the reduced rotation from a load shaft, an exact linearization method is used to suppress the loss of load shaft positioning control precision due to the nonlinear spring characteristics of the wave gear device for which a clear analysis and control method has not been established. Specifically, as a nonlinear characteristic compensation method for a wave gear device, the inventors propose nonlinear spring compensation based on an exact linearization method for the nonlinear spring characteristics between the motor shaft and load shaft of the wave gear device.

An object of the present invention is to provide a positioning control system for an actuator provided with a wave gear device, wherein compensation based on an exact linearization method for the nonlinear characteristics of the wave gear device is extended not only to nonlinear spring characteristics but also to an angular transmission error component and nonlinear friction.

Means to Solve the Problems

To solve the problems described above, according to the present invention, there is provided a positioning system for controlling the driving of an actuator which reduces the rotation of a motor via a wave gear device and transmits the reduced rotation to a load shaft, and for controlling the positioning of the load shaft; the system comprising a semi-closed loop feedback control element for feeding back a motor shaft position $\theta_m$ to control the positioning of the load shaft, and a feedforward linearization compensator for compensating positioning errors in the load shaft due to nonlinear elements of the actuator. The nonlinear elements for which compensation is to be performed include instances of: only a relative rotation-synchronous component; only nonlinear friction; both a relative rotation-synchronous component and nonlinear spring characteristics; both nonlinear friction and nonlinear spring characteristics; both a relative rotation-synchronous component and nonlinear friction; and nonlinear spring characteristics, a relative rotation-synchronous component, and nonlinear friction. The feedforward linearization compensator is obtained from the equivalent conversion of a feedback linearization compensator into a feedforward compensator, by incorporating a nonlinear plant model representing the actuator to be controlled into a feedback linearization compensator based on an exact linearization method.

The nonlinear plant model is defined by the nonlinear state equation shown in formula (6), the state quantity being $x=[\theta_l, \omega_l, \theta_m, \omega_m]^T$.

$$\begin{cases} \frac{dx}{dt} = \begin{bmatrix} \omega_l \\ \frac{\tau_g(\theta_{tw})}{J_l} + \frac{D_g}{J_l}\omega_{tw} - \frac{D_l\omega_l + \tau_l(\omega_l)}{J_l} \\ \omega_m \\ -\frac{\tau_g(\theta_{tw})}{J_m N} - \frac{D_g}{J_m N}\omega_{tw} - \frac{D_m\omega_m + \tau_m(\omega_m)}{J_m} \end{bmatrix} + \begin{bmatrix} 0 & 0 & 0 & \frac{K_t}{J_m} \end{bmatrix}^T i \\ y = [1 \ 0 \ 0 \ 0]x = \theta_l \end{cases} \quad (6)$$

By adding linearization feedback α(x) and an input variable β(x), with the state quantity x as an argument, to the nonlinear plant model, the feedback linearization compensator brings the characteristic from the input v to the output y of the expanded system to $d^3y/dt^3=v$, the linearization feedback α(x) being defined by formula (9) and the input variable β(x) being defined by formula (10).

$$\alpha(x) = -\frac{J_m N}{K_t D_g}\left\{\frac{d\tau_g(\theta_{tw})}{dt} - \left(\frac{D_g}{J_m N^2} + \frac{D_l + D_g}{J_l}\right)\tau_g(\theta_{tw}) - \right.$$

$$D_g\left(\frac{D_g}{J_m N^2} + \frac{D_l + D_g}{J_l}\right)\omega_{tw} + D_g\frac{d^2\theta_{Sync}(\theta_m)}{dt^2} -$$

$$\left.\frac{D_g(D_m\omega_m + \tau_m(\omega_m))}{J_m N} + \frac{D_l + D_g}{J_l}(D_l\omega_l + \tau_l(\omega_l)) - \frac{d\tau_l(\omega_l)}{dt}\right\} \tag{9}$$

$$\beta(x) = \frac{J_m J_l N}{K_t D_g} \tag{10}$$

Furthermore, the feedforward linearization compensator uses a load jerk command $j_{ref}$ as the input v, calculates a feedforward current command $i^*_{ref}$ as the output y using a state quantity estimation value $x^*$ calculated based on the nonlinear plant model, and calculates a feedforward motor position command $\theta_m$ to be input to the feedback controller.

The nonlinear spring characteristics in the present invention are nonlinear spring characteristics of the wave gear device relative to load torque defined by formula (1), and the coefficients $K_{g1}$, $K_{g2}$, $K_{g3}$ of various degrees of formula (1) are set so as to make it possible to reproduce experiment nonlinear spring characteristics obtained by adding load torque to the actuator and measuring the relationship between load torque and the twisting angle between the motor and load shafts.

$$\tau_g(\theta_{tw}) = K_{g3}\theta_{tw}^3 + K_{g2}\theta_{tw}^2 + K_{g1}\theta_{tw} \tag{1}$$

Among the angular transmission errors of the wave gear device, the relative rotation-synchronous component in the present invention is an angular transmission error defined by formula (3), the relative rotation-synchronous component being the motor shaft synchronous component $\theta_{TEM}$ produced synchronously with the rotation of the motor shaft. The angular transmission error when a minute angle-feeding action of the actuator has stabilized is measured for one rotation of the load shaft, and a spectral analysis is conducted in which the experiment relative rotation-synchronous component relative to the motor position has undergone Fourier transformation. Based on this, the amplitude $A_k$ and phase $\phi_k$ of the integral multiple harmonic component of the motor rotation in formula (3) are set so that the experiment relative rotation-synchronous component can be reproduced.

$$\theta_{Sync}(\theta_m) = \sum_{k=1}^{n} A_k \cos(k\theta_m + \phi_k) \tag{3}$$

Of the nonlinear friction of the wave gear device, the nonlinear friction in the present invention comprises the motor shaft friction $\tau_m(\omega_m)$ and the load shaft friction $\tau_l(\tau_l)$, which are static friction dependent on speed and are defined respectively by formula (4) and formula (5). The motor torque is measured during a constant motor speed, and the parameters $C_m$, $C_l$, $B_m$, and $B_l$ of formula (4) and formula (5) are set so as to make it possible to reproduce the experiment friction characteristics obtained from a constant speed driving test in which motor torque is treated as frictional torque.

$$\tau_m(\omega_m) = C_m \tan h(B_m \omega_m) \tag{4}$$

$$\tau_l(\omega_l) = C_l \tan h(B_l \omega_l) \tag{5}$$

The feedforward linearization compensator preferably compensates positioning errors of the load shaft due to the nonlinear spring characteristics, the relative rotation-synchronous component, and the nonlinear friction.

To compensate positioning errors due to a dead time element $e^{-Ls}$ in the control system, the feedforward linearization compensator uses the Smith method to delay the feedforward motor position command $\theta^*_m$ by a preset dead time L, and then supplies the command to the feedback controller.

Effect of the Invention

The present invention proposes a model base control system for nonlinear spring characteristics, a relative rotation-synchronous component, and nonlinear friction, which are nonlinear characteristics of a wave gear device, for the purpose of improving positioning performance of a positioning mechanism that includes the wave gear device. Modeling is performed as a differentiable function on these nonlinear characteristics, and a positioning control system is designed which uses feedforward compensation based on exact linearization. According to the system of the present invention, overshooting caused by nonlinear springs and nonlinear friction can be inhibited to shorten positioning time in the operation of positioning an actuator provided with a wave gear device, and response contained vibration and load positioning variation during stabilizing due to angular transmission error can be suppressed,

BEST MODE FOR CARRYING OUT THE INVENTION

The following is a description, made with reference to the drawings, of a nonlinear characteristic compensation method using an exact linearization method in a positioning control system for an actuator provided with a wave gear device to which the present invention is applied.

[Device Configuration of Actuator Provided with Wave Gear Device]

Figure 1:
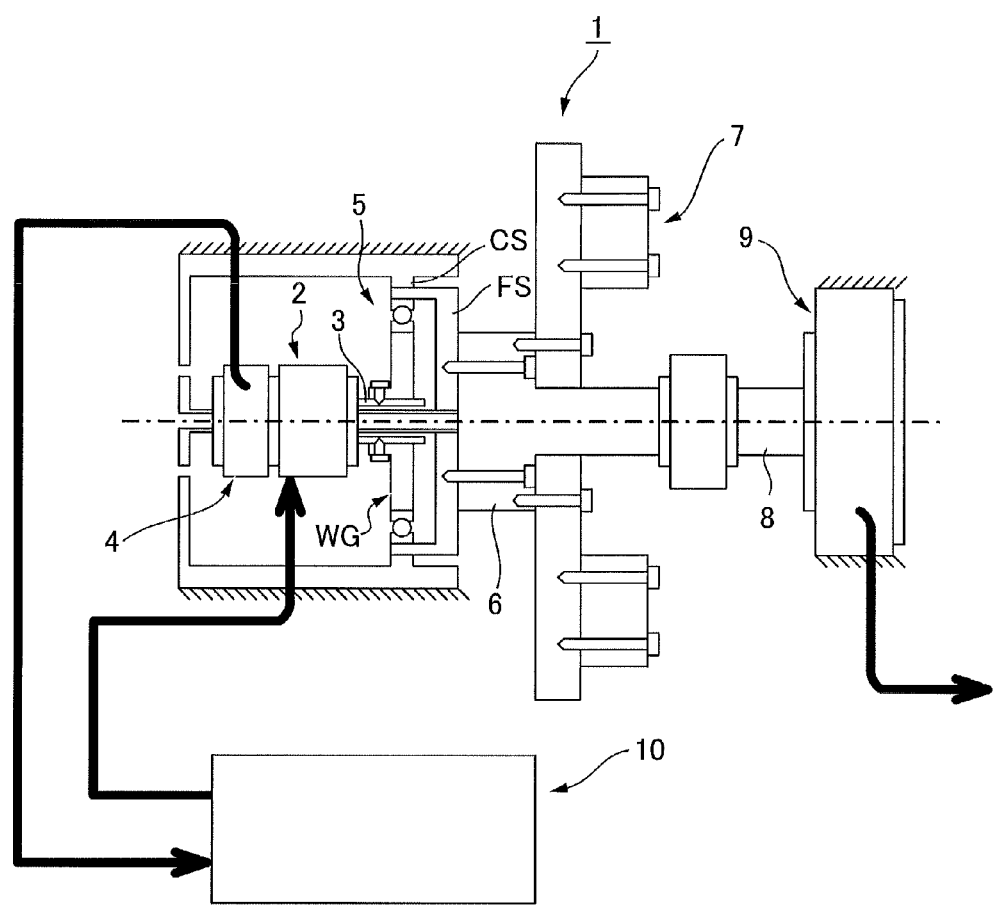
FIG. 1 is an explanatory drawing showing a configuration example of an actuator to be controlled in the present invention.

FIG. 1 is a schematic view of an actuator including a wave gear device as a reducer, which is the object to be controlled in the present invention. Table 1 shows the primary specifications of the actuator.

TABLE 1

Specifications of prototype

| | |
|---|---|
| maximum load torque | 3.3 Nm |
| maximum load speed | 120 rpm |
| gear ratio: N | 50 |
| FS tooth number: $z_f$ | 100 |
| CS tooth number: $z_c$ | 102 |
| motor encoder resolution | 8,000 pulse/rev. |
| load encoder resolution | 2,880,000 pulse/rev. |

The actuator 1 acquires reduced rotation of a motor 2 via a wave gear device 5 as a reducer, and rotatably drives a load apparatus 7. A positioning control system 10 for the actuator 1 constitutes a semi-closed control system which uses position information of an encoder 4 installed on a motor shaft 3 of the motor 2 to position the load apparatus 7 connected to an output shaft 6 of the wave gear device 5, and the positioning control system uses a position proportional-speed proportional integral (P-PI) compensator for feedback control. The inertia ratio between the motor 2 and the load is approximately 1:3 after being converted by the motor shaft. To model the nonlinear elements of the wave gear device 5 and to evaluate the nonlinear compensation results, the position of the load shaft 8 of the load apparatus rotatably driven by the actuator 1 is measured by a load shaft encoder 9.

[Modeling Actuator Including Nonlinear Elements of Wave Gear Device]

In the present invention, the actuator 1 is modeled in the following manner, accounting for the application of the exact linearization method.

The actuator 1 provided with a wave gear device is commonly treated as a two-inertial model accounting for torsion characteristics, because torsional vibration between the motor and load shafts is induced when motor torque or load torque is applied.

Figure 2:
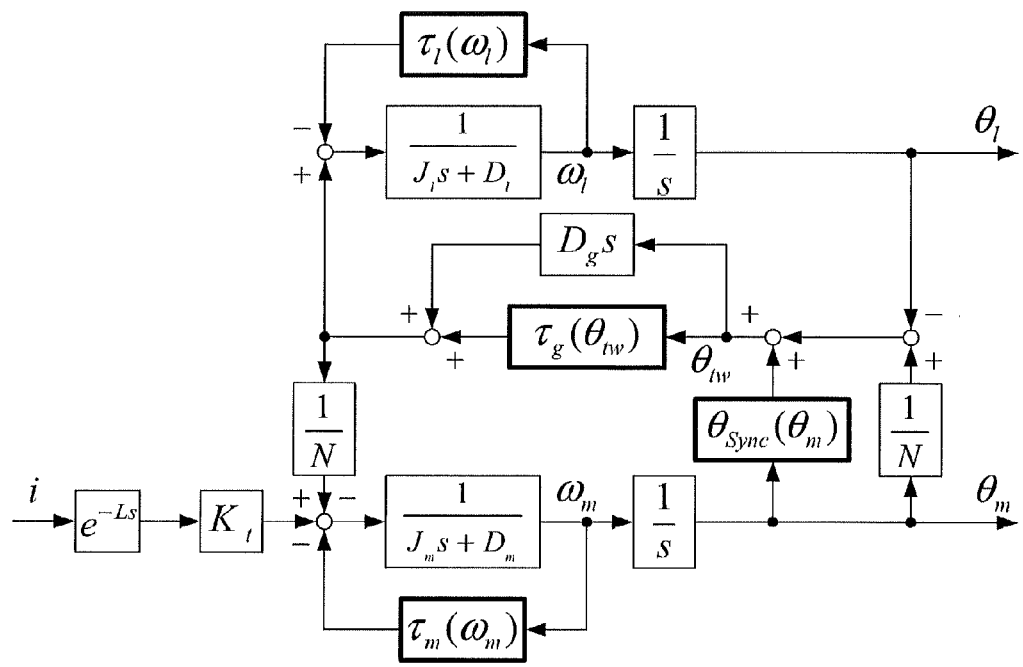
FIG. 2 is a block line diagram of a two-inertia model representing an actuator provided with a wave gear device.

FIG. 2 shows a two-inertia model as the objective of positioning control used in the present invention. The symbols in the drawing are as follows, and the nonlinear elements are shown in the bold-lined blocks.

$J_m$: motor shaft inertia moment
$D_m$: motor shaft viscous friction coefficient
$J_l$: load shaft inertia moment
$D_l$: load shaft viscous friction coefficient
$\tau_g (\theta_{tw})$: nonlinear spring characteristics of reducer
$D_g$: viscous friction coefficient of reducer
N: reduction ratio
$K_t$: motor torque constant
$\theta_m$: motor shaft position
$\omega_m$: motor speed
$\theta_l$: load shaft position
$\omega_l$: load speed
$\theta_{tw}$: twisting angle
$\theta_{Sync} (\theta_m)$: relative rotation-synchronous component of angular transmission error
$\tau_m (\omega_m)$: motor shaft nonlinear frictional torque
$\tau_l (\omega_l)$: load shaft nonlinear frictional torque
i: motor torque current command value $e^{-Ls}$: dead time element from current command value to actual current depending on calculation time or communication time The nonlinear spring characteristics, angular transmission error, and nonlinear friction of the wave gear device are all modeled below as nonlinear elements included in the object to be controlled. Design specification values are used for linear parameters other than these nonlinear elements, and Table 2 shows the constants thereof.

TABLE 2

Parameters of 2-inertia model

| | | |
|---|---|---|
| torque constant | $K_t$ | 0.144 Nm/A |
| inertia of motor | $J_m$ | $2.87 \times 10^{-6}$ kgm$^2$ |
| inertia of load | $J_l$ | $2.12 \times 10^{-2}$ kgm$^2$ |
| damping of motor | $D_m$ | $2.47 \times 10^{6}$ Nm/(rad/s) |
| damping of load | $D_l$ | $2.60 \times 10^{-3}$ Nm/(rad/s) |
| damping of gear | $D_g$ | 0.355 Nm/(rad/s) |
| time delay | L | 1.32 ms |

(Modeling Nonlinear Spring Characteristics)

Figure 3:
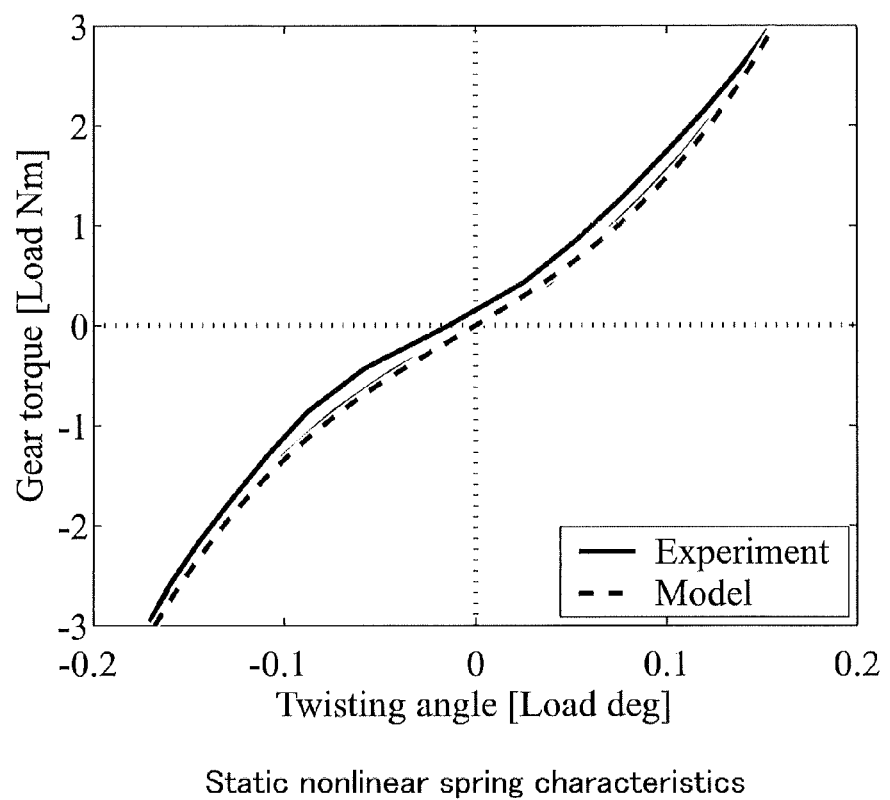
FIG. 3 is a graph showing the static nonlinear spring characteristics of an experiment and a model.

To measure the nonlinear spring characteristics, an arm and a weight were attached to the load shaft and load torque was applied by gravity with the motor shaft in a servo-locked state, and the load torque and the twisting angle between the motor and load shafts were measured. The load torque was then gradually increased, after which load torque was applied in the opposite direction, and a series of nonlinear spring characteristic measurements were taken until a zero-load state was reached. The static nonlinear spring characteristics are shown by the solid line (experiment) in FIG. 3. It is clear from this graph that the spring characteristics exhibit hysteretic nonlinear characteristics.

Concerning these characteristics, the nonlinear spring characteristics $\tau_g (\theta_{tw})$ are expressed by the following formula (1) using a non-hysteretic third-order polynomial that can be differentiated for the twisting angle $\theta_{tw}$ between the motor and load shafts.

$$\tau_g(\theta_{tw}) = K_{g3}\theta_{tw}^3 + K_{g2}\theta_{tw}^2 + K_{g1}\theta_{tw} \quad (1)$$

$K_{g3}$ to $K_{g1}$, which are coefficients of various degrees of the polynomial, were determined by applying the least-squares method to the measurement results. The values of these parameters are shown in Table 3, and a model of the identified nonlinear spring characteristics is shown as well by the dashed line (model) in FIG. 3.

TABLE 3

Parameters of nonlinear models

| | | | | |
|---|---|---|---|---|
| $K_{g3}$ | $5.12 \times 10^{7}$ Nm/rad$^3$ | | $K_{g2}$ | 6812 Nm/rad$^2$ |
| $K_{g1}$ | 665.3 Nm/rad | | | |
| $A_1$ | 3.85 arc-sec | | $\phi_1$ | −156.0 deg |
| $A_2$ | 9.28 arc-sec | | $\phi_2$ | −155.6 deg |
| $A_3$ | 2.03 arc-sec | | $\phi_3$ | −104.6 deg |
| $A_4$ | 11.49 arc-sec | | $\phi_4$ | −73.0 deg |
| $C_m$ | $5.36 \times 10^{-3}$ Nm | | $B_m$ | 10.0 |
| $C_l$ | $2.19 \times 10^{-2}$ Nm | | $B_l$ | 500.0 |

(Modeling Angular Transmission Error)

The angular transmission error $\theta_{TE}$ is generally defined by the following formula (2), using the motor shaft position $\theta_m$, the load shaft position $\theta_l$, and the reduction ratio N.

$$\theta_{TE} = \theta_l - \frac{\theta_m}{N} \quad (2)$$

The relative rotation-synchronous component $\theta_{Sync}$ of the angular transmission error, which is the object to be compensated in the present invention, is a component produced by assembly errors such as accumulated pitch error in the flex spline (FS) and circular spline (CS) constituting the wave gear device, and axial misalignment between the wave gear device and the load. The relative rotation-synchronous component $\theta_{Sync}$ is also produced in synchronization with the relative rotations of the wave generator (WG), the FS, and the CS. Therefore, $\theta_{Sync}$ can be expressed as a sum of the motor shaft synchronous component $\theta_{TEM}$, the load shaft synchronous component $\theta_{TEL}$, and the FS-WG relative synchronous component $\theta_{TERE}$, by superposing sine waves that use as an argument. Because $\theta_{TEL}$ and $\theta_{TERE}$ require load position information, it is essentially impossible for them to be compensated in a semi-closed control system. In view of this, $\theta_{Sync}$ is modeled below in the following formula (3), using only $\theta_{TEM}$ as a relative rotation-synchronous component.

$$\theta_{Sync}(\theta_m) = \sum_{k=1}^{n} A_k \cos(k\theta_m + \phi_k) \quad (3)$$

k: harmonic order relative to motor rotation
$A_k$: amplitude of components of different degrees
$\phi_k$: phase of components of different degrees When the relative rotation-synchronous components are modeled, the angular transmission error when the minute angle-feeding action has stabilized is measured for one rotation of the load shaft, a spectral analysis is conducted in which angular transmission error characteristics relative to the motor position have undergone Fourier transformation, the amplitude $A_k$ and phase $\phi_k$ of the integral multiple harmonics of the motor rotation are extracted, and formula (3) is identified.

Figure 4:
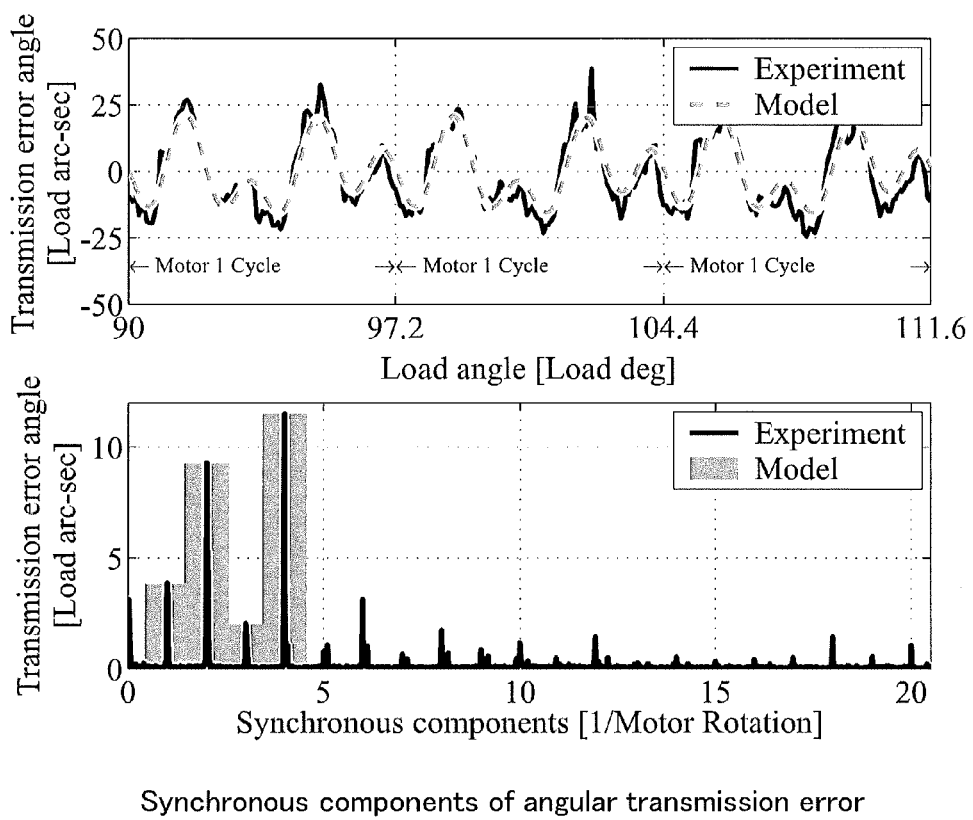
FIG. 4 is a graph showing the waveforms of relative rotation-synchronous components of an experiment and a model, and the spectral waveforms thereof.

FIG. 4 shows a waveform of an experiment relative rotation-synchronous component, and a spectral waveform thereof. In FIG. 4, the solid line (experiment) in the top row represents the angular transmission error waveform resulting from continuously measuring a minute feeding action of the motor shaft angle in 3.6 degree increments, and the solid line in the bottom row represents a spectral waveform of the top row. The arc-sec units of the vertical axes in these graphs are angular units, 1 deg being equal to 3600 arc-secs. These graphs show that, in the relative rotation-synchronous components, the first through fourth-order components relative to the motor rotation have large amplitudes and that higher-order components are present up to about order 20 at maximum. Fourth- and lower-order components are modeled and used in the compensation herein because to suppress vibration caused by the relative rotation-synchronous components during the positioning response, the torque current includes many harmonic components and becomes vibrational when high-order components are compensated. The top row dashed line (model) and the bottom row bold line (model) in FIG. 4 represent waveforms in which components fourth-order and lower have been extracted and modeled, and the identified parameters $A_1$ to $A_4$ and $\phi_1$ to $\phi_4$ of the various degrees are shown in Table 3 previously presented.

(Modeling Nonlinear Friction)

Figure 5:
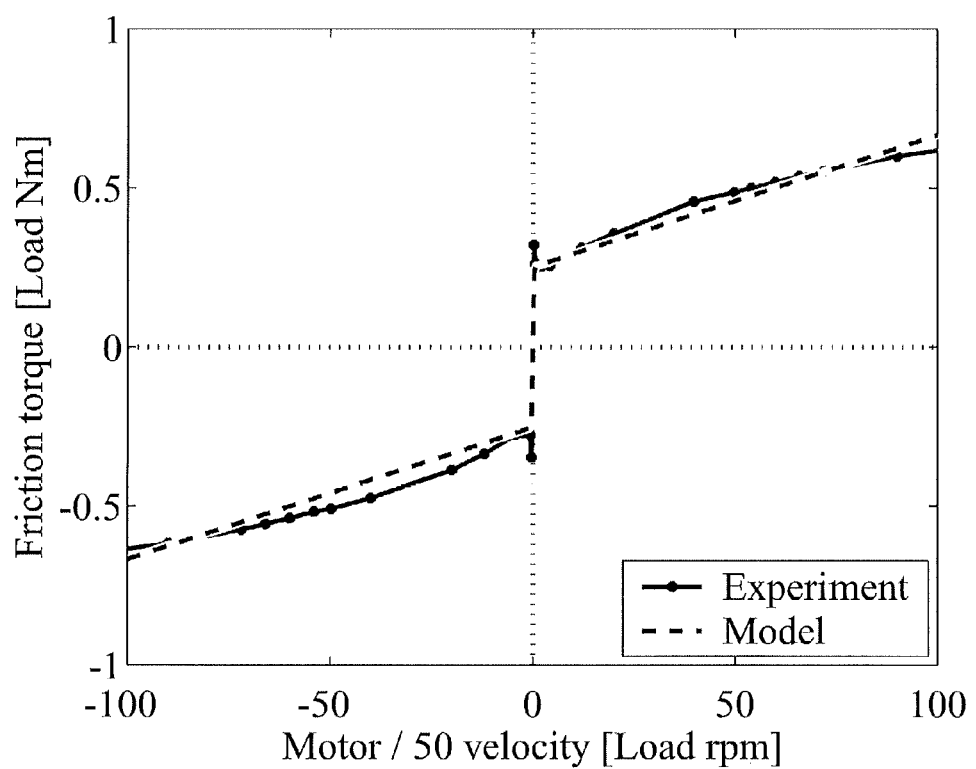
FIG. 5 is a graph showing nonlinear friction characteristics of an experiment and a model.

Nonlinear friction is classified as one of two main types of friction: static friction, which is dependent on speed and is dominant in the positioning actions of long strokes; and dynamic friction, which is dependent on the displacement associated with elasticity and is dominant in very small strokes. In the present invention, static friction dependent on speed is modeled because the objective is positioning that considered to be that of long strokes for both the motor and load shafts. The solid line (experiment) in FIG. 5 represents the experiment fiction characteristics according to a constant speed driving test in which the motor torque was measured during a constant motor speed and the motor torque was treated as frictional torque. In this graph, the viscous friction is accompanied by approximately 0.4 Nm of coulomb friction, and the effects thereof cannot be ignored when compared with the maximum load torque of 3.3 Nm of the wave gear device. In view of this, the motor shaft friction $\tau_m(\omega_m)$ and the load shaft friction $\tau_l(\omega_l)$ are expressed respectively in the following formula (4) and formula (5) as differentiable functions, using a TAN H function so as to smoothly connect the different types of friction in the area where the speed changes from negative to positive or vise versa, similar to the modeling of nonlinear spring characteristics.

$$\tau_m(\omega_m) = C_m \tan h(B_m \omega_m) \quad (4)$$

$C_m$: nonlinear friction force of motor shaft
$B_m$: speed of friction force switching between positive and negative when speed is near zero $$\tau_l(\omega_l) = C_l \tan h(B_l \omega_l) \quad (5)$$

$C_l$: nonlinear friction force of load shaft
$B_l$: speed of friction force switching between positive and negative when speed is near zero $C_m$ and $C_l$ are allocated to the motor shaft and the load shaft so as to reproduce the experiment positioning time response, on the basis of the constant speed driving test results. These parameters are shown in Table 3 presented previously, and the dashed line (model) of FIG. 5 shows the characteristics of a friction model obtained by adding viscous friction proportionate to speed to a nonlinear friction model.

[Nonlinear Compensation Based on Exact Linearization Method]

Figure 6:
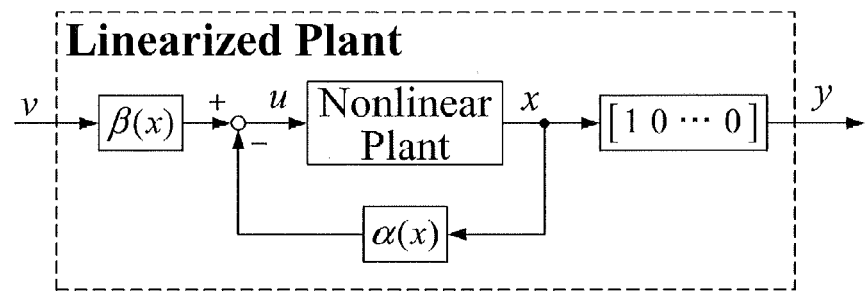
FIG. 6 is a block line diagram of input/output linearization by an exact linearization method.

FIG. 6 is a conceptual block diagram of input/output linearization using the exact linearization method, wherein the characteristics from the input v to the output y of the expanded system are brought to $d''y/dt''$ by adding the linearization feedback $\alpha(x)$ and the input variable $\beta(x)$, which include the state quantity x as an argument, to a "nonlinear plant" as the object to be controlled including nonlinear elements.

In applying exact linearization to the object to be controlled, when the state quantity is chosen as $x = [\theta_l, \omega_l, \theta_m, \omega_m]^T$ from the block line diagram of the object to be controlled shown in FIG. 2, the nonlinear state equation is given by the following formula (6).

$$\begin{cases} \frac{dx}{dt} = \begin{bmatrix} \omega_l \\ \frac{\tau_g(\theta_{tw})}{J_l} + \frac{D_g}{J_l}\omega_{tw} - \frac{D_l\omega_l + \tau_l(\omega_l)}{J_l} \\ \omega_m \\ -\frac{\tau_g(\theta_{tw})}{J_m N} - \frac{D_g}{J_m N}\omega_{tw} - \frac{D_m\omega_m + \tau_m(\omega_m)}{J_m} \end{bmatrix} + \begin{bmatrix} 0 & 0 & 0 & \frac{K_t}{J_m} \end{bmatrix}^T i \\ y = [1 \ 0 \ 0 \ 0]x = \theta_l \end{cases} \quad (6)$$

The dead time element $e^{-Ls}$ is not included in the formula above because the effects thereof are compensated by the Smith method, described hereinafter. The relative rotation-synchronous component $\theta_{Sync}(\theta_m)$ does not appear in formula (6) because it is included in the twisting angle $\theta_{tw}$ and the twisting speed $\omega_{tw}=d\theta_{tw}/dt$ of formula (7) and formula (8).

$$\theta_{tw} = \frac{\theta_m}{N} - \theta_l + \theta_{Sync}(\theta_m) \quad (7)$$

$$\omega_{tw} = \frac{\omega_m}{N} - \omega_l + \frac{d\theta_{Sync}(\theta_m)}{dt} \quad (8)$$

When the time portion of the final control quantity y of formula (6) is repeated until the control input i emerges on the right side, i appears in the quantity $d^3y/dt^3$ which is a third-order differential of y, and $\alpha(x)$ and $\beta(x)$ are given by formula (9) and formula (10).

$$\alpha(x) = -\frac{J_m N}{K_t D_g}\left\{\frac{d\tau_g(\theta_{tw})}{dt} - \left(\frac{D_g}{J_m N^2} + \frac{D_l + D_g}{J_l}\right)\tau_g(\theta_{tw}) - \right.$$
$$D_g\left(\frac{D_g}{J_m N^2} + \frac{D_l + D_g}{J_l}\right)\omega_{tw} + D_g\frac{d^2\theta_{Sync}(\theta_m)}{dt^2} -$$
$$\left.\frac{D_g(D_m\omega_m + \tau_m(\omega_m))}{J_m N} + \frac{D_l + D_g}{J_l}(D_l\omega_l + \tau_l(\omega_l)) - \frac{d\tau_l(\omega_l)}{dt}\right\} \quad (9)$$

$$\beta(x) = \frac{J_m J_l N}{K_t D_g} \quad (10)$$

When the above quantities $\alpha(x)$ and $\beta(x)$ are applied, the input/output characteristic of the expanded system in FIG. 6 is $y/v=1/s^3$, and the expanded system input v is therefore equivalent to the load jerk command $j_{ref}$.

In formula (9), $\alpha(x)$ includes a first-order differential of $\tau_g(\theta_{tw})$, a second-order differential of $\theta_{Sync}$, and a first-order differential of $\tau_l(\omega_l)$. According to the modeling of the nonlinear elements previously discussed, the differential coefficients $d\tau_g(\theta_{tw})/dt$, $d^2\theta_{Sync}(\theta_m)/dt^2$, and $d\tau_l(\omega_l)/dt$ pertaining to the nonlinear elements are calculated as shown below using formulas (1), (3), and (5).

$$\frac{d\tau_g(\theta_{tw})}{dt} = (3K_{g3}\theta_{tw}^2 + 2K_{g2}\theta_{tw} + K_{g1})\omega_{tw} \quad (11)$$

$$\frac{d^2\theta_{Sync}(\theta_m)}{dt^2} = -a_m\sum_{k=1}^{n}kA_k\sin(k\theta_m + \phi_k) - \omega_m^2\sum_{k=1}^{n}k^2A_k\cos(k\theta_m + \phi_k) \quad (12)$$

$$\frac{d\tau_l(\omega_l)}{dt} = \frac{C_l B_l a_l}{\cosh^2(B_l\omega_l)} \quad (13)$$

In applying these formulas to experiments of the linearization method, $\alpha(x)$ includes all state quantities x according to formula (9), but because the state quantity of the load shaft cannot be detected by the positioning control system of the present invention which is a semi-closed control system, it is not possible to implement the system in this state. Furthermore, because there is a finite dead time element, it must be compensated as well. In view of this, implementation in a semi-closed control system and dead time compensation are addressed by an equivalent conversion of the feedback (FB) linearization compensation in FIG. 6 to feedforward (FF) linearization compensation.

Figure 7:
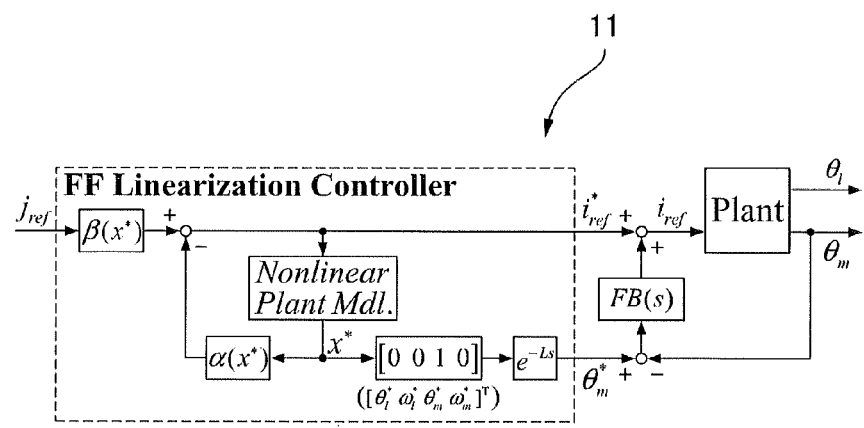
FIG. 7 is a block line diagram showing the control system of the present invention.

Specifically, in the FF linearization compensator 11 of the positioning control system 10 as shown in FIG. 7, a "nonlinear plant model" to be controlled is contained within the compensator, and a positively calculated state quantity estimation value x* is used to calculate a FF current command $i^*_{ref}$ and a FF motor position command $\theta^*_m$ that will be input to a FB control system FB(s). Furthermore, the Smith method is applied and $\theta^*_m$ is delayed by the dead time L to compensate the effects thereof.

Not only can the method of the present invention be implemented in a semi-closed control system; it also has the advantage of not requiring stable analysis of a FB system in a linearization compensator because the compensation is essentially FF compensation.

[Experiment Verification of Nonlinear Compensation]

A positioning control system constructed as described above for performing nonlinear compensation based on an exact linearization method was implemented in an experiment positioning control system, and the compensation effects thereof were verified through testing.

(Positioning Test Conditions)

Among the nonlinear elements treated as objects to be controlled, the angular transmission errors and relative rotation-synchronous components are the causes of steady-state deviation and vibration inducement in the load position, and the gear meshing conditions of the wave gear device must therefore be taken into account when setting a positioning-feeding angle for the experiment validation. In view of this, to evaluate variation in steady-state deviation of the static load position, the evaluation is made according to the feed angle whereby the meshing of the gears changes, so that the stabilized relative rotation-synchronous component has a different value with each positioning.

When evaluating vibration during a dynamic positioning action, the effect of the relative rotation-synchronous component differs with each positioning at a feed angle at which the meshing of the gears changes with each response, the vibrations from the relative rotation-synchronous component in the positioning responses cancel each other out when a plurality of responses are averaged, and an appropriate evaluation cannot be conducted. Therefore, in setting the feed angle, the value of 6.05 motor rotations=45.56 Load deg, at which meshing of the gears changes with each positioning (static characteristic compensation test), is selected when evaluating variation in static load position steady-state deviation, and the value of 6 motor rotations=43.2 Load deg, at which meshing is constant with each positioning (dynamic characteristic compensation test), is selected when evaluating vibration in the dynamic positioning action, allowing independent assessments to be performed. The conventional control system used for comparing the control results is a two-degree-of-freedom control system based on an irreducible factored expression that does not account for nonlinear characteristics.

(Test Results)

Static Compensation Characteristics

Figure 8:
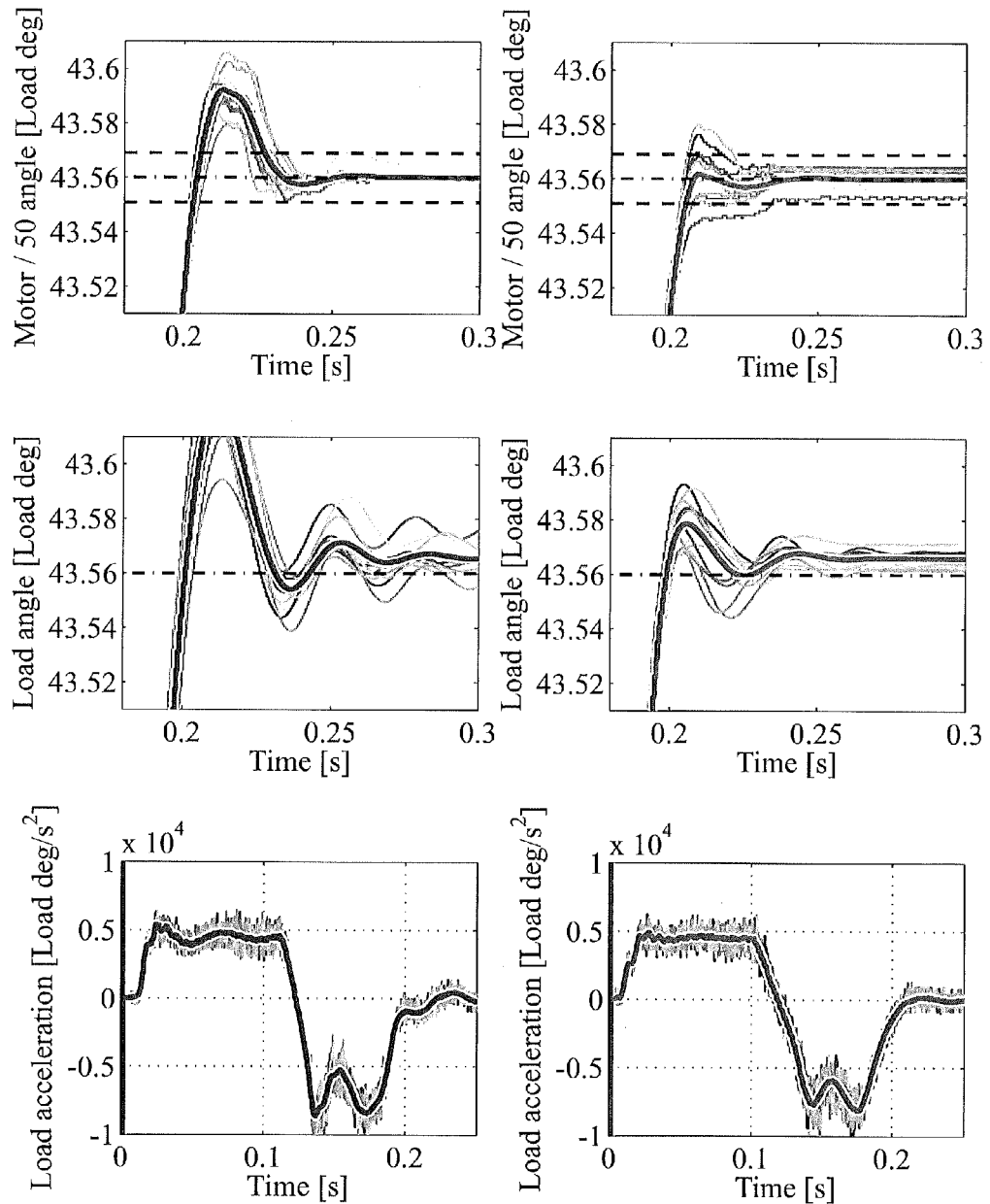
FIG. 8 includes graphs showing the results of evaluating static compensation characteristics in the control system of the present invention and a conventional control system.

A continuous unidirectional positioning action with a feed angle of 43.56 Load deg (240 times, in feed intervals of 1.25 s) was performed with the objective of evaluating the static compensation precision of the control system of the present invention. The top rows in FIG. 8 show twelve responses extracted and superposed together for motor position, the middle rows show the same for load position, and the bottom rows show the same for load acceleration. In FIG. 8, the left column shows the responses of the conventional control system and the right column shows the responses of the control system of the present invention, wherein the bold lines show the average values of 240 responses and the horizontal single-dash lines show the target positions. Furthermore, the horizontal dashed lines of the motor position responses show the motor shaft±10 motor pulse=32.4 Load arc-sec, set as a target stabilization range.

According to the motor position responses in the top rows and the load position responses in the middle rows of FIG. 8, the control system of the present invention can greatly inhibit overshooting in comparison with a conventional control system. In the load position response of the conventional control system in the left middle row, the positioning response and the load stabilizing position vary depending on the angular transmission error. In the control system of the present invention, the angular transmission error can be compensated and the variation in the load stabilizing position can be condensed as in the middle row, by inputting FF motor position compensation for shifting the motor position of the top row by an amount equivalent to the angular transmission error. Furthermore, according to the load acceleration response of the bottom row, the vibration component in the control system of the present invention is suppressed between 0.02 and 0.05 s after the start of positioning, and at stabilization at approximately 0.2 s.

To statistically and quantitatively evaluate the static compensation results described above, the variation in the load position steady-state deviation was compared with the average stabilization time of 240 positionings, using a standard deviation of 3σ as an index. Table 4 shows a comparison of index values. The bottom row of items shows evaluation values that have been standardized with the conventional control system as a reference, and according to this table, the control system of the present invention can reduce positioning time to 90% of that of the conventional control system, and can reduce variation in the load position to 64%.

TABLE 4

Comparison of compensation performance for static characteristics

|  | Conventional | Proposed | |
| --- | --- | --- | --- |
| settling time | 0.227 | 0.205 | s |
|  | 100 | 90 | % |
| 3σ | 57.3 | 36.9 | arc-sec |
|  | 100 | 64 | % |

Dynamic Compensation Characteristics

Figure 9:
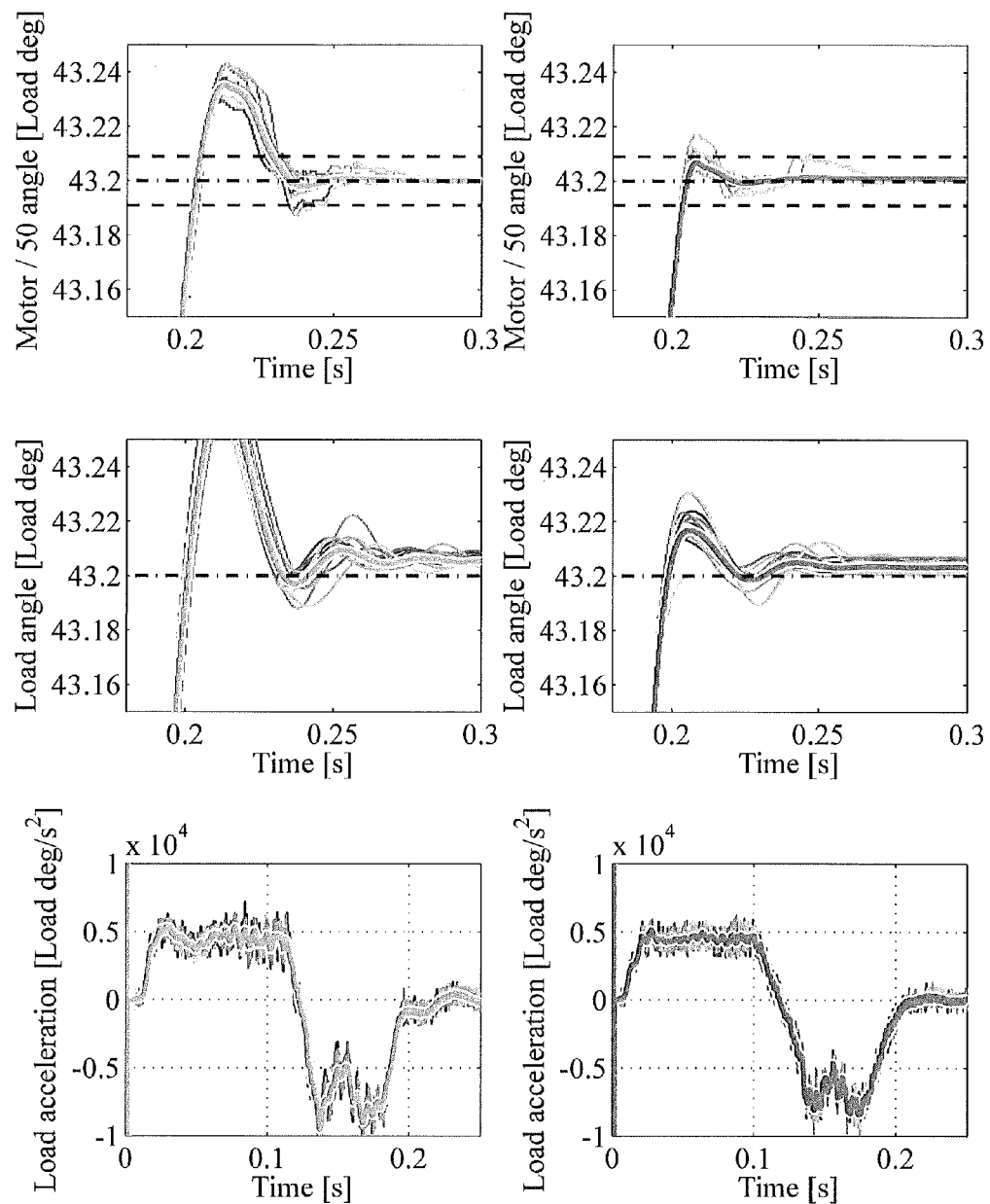
FIG. 9 includes graphs showing the results of evaluating dynamic compensation characteristics in the control system of the present invention and a conventional control system.

To evaluate dynamic compensation characteristics, the test was performed with a feed angle of 43.2 Load deg and the other conditions identical to those of the static compensation precision evaluation, and the results are shown in FIG. 9. Table 5 shows the established evaluation of the same indexes as the static compensation characteristics. The arrangement and types of lines are the same as in FIG. 8.

TABLE 5

Comparison of compensation performance for dynamic characteristics

|  | Conventional | Proposed | |
| --- | --- | --- | --- |
| settling time | 0.230 | 0.204 | s |
|  | 100 | 89 | % |
| 3σ | 17.7 | 20.7 | arc-sec |
|  | 100 | 117 | % |

According to the load position response in the middle rows of FIG. 9, overshooting is greatly suppressed in the control system of the present invention, similar to the static characteristic compensation test, and Table 5 also shows that positioning time can be shortened. The variation 3σ of Table 5 is larger than that of the conventional control system. This is because with feed angles having the same gear meshing, the relative rotation-synchronous component has the same value with each positioning, the relative rotation-synchronous component does not cause any variation regardless of whether or not there is compensation, and the absolute value thereof is therefore small. The average responses of load acceleration in the bottom rows, both for the conventional control system and the control system of the present invention, exhibit vibration not seen in the static compensation evaluation responses shown in the bottom row of FIG. 8. This is because in the static characteristic compensation test, the meshing changes with each positioning, and the vibration caused by the relative rotation-synchronous component appears to be canceled out. In the control system of the present invention of FIG. 9, 0.05 to 0.1 s more vibration is inhibited than in the conventional control system, and the vibration in the positioning response caused by the relative rotation-synchronous component can be compensated.

From the descriptions above, it is clear that the control system of the present invention can suppress overshooting due to nonlinear springs and nonlinear friction, shorten positioning time, and inhibit vibration in the response and load position variation during stabilization due to angular transmission errors. According to compensation evaluation testing using a testing apparatus, positioning time was shorted to 90% by overshooting suppression during stabilization, variation during stabilization was condensed to 64%, and reduction of the vibration of the load shaft in the positioning response was successfully achieved.

The invention claimed is:

1. A positioning system for controlling driving of an actuator which reduces in speed of rotation of a motor via a wave gear device and transmits the reduced-speed rotation to a load shaft, so as to control positioning of the load shaft; the system comprising:

a semi-closed loop feedback controller for feeding back a motor shaft position $\theta_m$ to control the positioning of the load shaft, and a feedforward linearization compensator for compensating positioning errors in the load shaft due to at least relative rotation-synchronous component or nonlinear friction among nonlinear spring characteristics, relative rotation-synchronous component and nonlinear friction which are nonlinear elements of the actuator, wherein the nonlinear elements for which compensation is to be performed is: only a relative rotation-synchronous component; only nonlinear friction; both a relative rotation-synchronous component and nonlinear friction; or nonlinear spring characteristics, a relative rotation-synchronous component and nonlinear friction;

the feedforward linearization compensator is obtained from an equivalent conversion of a feedback linearization compensator into a feedforward compensator, by incorporating a nonlinear plant model representing the actuator to be controlled into the feedback linearization compensator based on an exact linearization method;

the nonlinear plant model is defined by the nonlinear state equation shown in formula (6), the state quantity being $x=[\theta_l, \omega_l, \theta_m, \omega_m]^T$, $$\begin{cases} \dfrac{dx}{dt} = \begin{bmatrix} \omega_l \\ \dfrac{\tau_g(\theta_{tw})}{J_l} + \dfrac{D_g}{J_l}\omega_{tw} - \dfrac{D_l\omega_l + \tau_l(\omega_l)}{J_l} \\ \omega_m \\ -\dfrac{\tau_g(\theta_{tw})}{J_m N} - \dfrac{D_g}{J_m N}\omega_{tw} - \dfrac{D_m\omega_m + \tau_m(\omega_m)}{J_m} \end{bmatrix} + \\ \qquad\qquad \begin{bmatrix} 0 & 0 & 0 & \dfrac{K_t}{J_m} \end{bmatrix}^T i \\ y = \begin{bmatrix} 1 & 0 & 0 & 0 \end{bmatrix} x = \theta_l \end{cases} \quad (6)$$

wherein
$J_m$: motor shaft inertia moment,
$D_m$: motor shaft viscous friction coefficient,
$J_l$: load shaft inertia moment,
$D_l$: load shaft viscous friction coefficient,
$T_g(\theta_{tw})$: nonlinear spring characteristics of reducer,
$D_g$: viscous friction coefficient of reducer,
N: reduction ratio,
$K_t$: motor torque constant,
$\theta_m$: motor shaft position,
$\omega_m$: motor speed,
$\theta_l$: load shaft position,
$\omega_l$: load speed,
$\theta_{tw}$: twisting angle,
$\theta_{Sync}(\theta_m)$: relative rotation-synchronous component of angular transmission error,
$\tau_m(\omega_m)$: motor shaft nonlinear frictional torque,
$\tau_l(\omega_l)$: load shaft nonlinear frictional torque, and
i: motor torque current command value;
by adding linearization feedback $\alpha(x)$ and an input variable $\beta(x)$, with the state quantity x as an argument, to the nonlinear plant model, the feedback linearization compensator brings the characteristic from the input v to the output y of the expanded system to $d^3y/dt^3=v$, the linearization feedback $\alpha(x)$ being defined by formula (9) and the input variable $\beta(x)$ being defined by formula (10), $$\alpha(x) = -\dfrac{J_m N}{K_t D_g}\left\{\dfrac{d\tau_g(\theta_{tw})}{dt} - \left(\dfrac{D_g}{J_m N^2} + \dfrac{D_l + D_g}{J_l}\right)\tau_g(\theta_{tw}) - \right. \qquad (9)$$
$$D_g\left(\dfrac{D_g}{J_m N^2} + \dfrac{D_l + D_g}{J_l}\right)\omega_{tw} + D_g\dfrac{d^2\theta_{Sync}(\theta_m)}{dt^2} -$$
$$\left. \dfrac{D_g(D_m\omega_m + \tau_m(\omega_m))}{J_m N} + \dfrac{D_l + D_g}{J_l}(D_l\omega_l + \tau_l(\omega_l)) - \dfrac{d\tau_l(\omega_l)}{dt}\right\}$$

$$\beta(x) = \dfrac{J_m J_l N}{K_t D_g}; \qquad (10)$$

the feedforward linearization compensator uses a load jerk command $j_{ref}$ as the input v, calculates a feedforward current command $i^*_{ref}$ as the output y using a state quantity estimation value $x^*$ calculated based on the nonlinear plant model, and calculates a feedforward motor position command $\theta^*_m$ to be input to the feedback controller;
the nonlinear spring characteristics in the present invention are nonlinear spring characteristics of the wave gear device relative to load torque defined by formula (1), and the coefficients $K_{g1}$, $K_{g2}$, $K_{g3}$ of various degrees of formula (1) are set so as to make it possible to reproduce experiment nonlinear spring characteristics obtained by adding load torque to the actuator and measuring the relationship between load torque and the twisting angle between the motor and load shafts, $$\tau_g(\theta_{tw}) = K_{g3}\theta_{tw}^3 + K_{g2}\theta_{tw}^2 + K_{g1}\theta_{tw} \qquad (1);$$

among the angular transmission errors of the wave gear device, the relative rotation-synchronous component is an angular transmission error defined by formula (3), the relative rotation-synchronous component being the motor shaft synchronous component $\theta_{TEM}$ produced synchronously with the rotation of the motor shaft, wherein the angular transmission error when a minute angle-feeding action of the actuator has stabilized is measured for one rotation of the load shaft, and a spectral analysis is conducted in which the experiment relative rotation-synchronous component relative to the motor position has undergone Fourier transformation, based on which the amplitude $A_k$ and phase $\phi_k$ of the integral multiple harmonic component of the motor rotation in formula (3) are set so that the experiment relative rotation-synchronous component can be reproduced, $$\theta_{Sync}(\theta_m) = \sum_{k=1}^{n} A_k \cos(k\theta_m + \phi_k); \qquad (3)$$

and
of the nonlinear friction of the wave gear device, the nonlinear friction comprises the motor shaft friction $\tau_m(\omega_m)$ and the load shaft friction $\tau_l(\omega_l)$, which are static friction dependent on speed and are defined respectively by formula (4) and formula (5), wherein the motor torque is measured during a constant motor speed, and the parameters $C_m$, $C_l$, $B_m$, and $B_l$ of formula (4) and formula (5) are set so as to make it possible to reproduce the experiment friction characteristics obtained from a constant speed driving test in which motor torque is treated as frictional torque, $$\tau_m(\omega_m) = C_m \tan h(B_m\omega_m) \qquad (4)$$

$$\tau_l(\omega_l) = C_l \tan h(B_l\omega_l) \qquad (5)$$

where
$C_l$: nonlinear friction force of load shaft, and
$B_l$: speed of friction force switching between positive and negative when speed is near zero.

2. The positioning control system for an actuator according to claim 1, wherein
the feedforward linearization compensator compensates positioning errors of the load shaft due to the nonlinear spring characteristics, the relative rotation-synchronous component, and the nonlinear friction.

3. The positioning control system for an actuator according to claim 2, wherein
the feedforward linearization compensator uses the Smith method to delay the feedforward motor position command $\theta^*_m$ by a preset dead time L, and then supplies the command to the feedback controller.

4. The positioning control system for an actuator according to claim 1, wherein
the feedforward linearization compensator uses the Smith method to delay the feedforward motor position command $\theta^*_m$ by a preset dead time L, and then supplies the command to the feedback controller.

* * * * *